April 13, 1937.  M. E. SALISBURY  2,076,747
SELF ADJUSTING OIL RETAINER
Filed Oct. 19, 1935
Fig.1.
Fig.2.
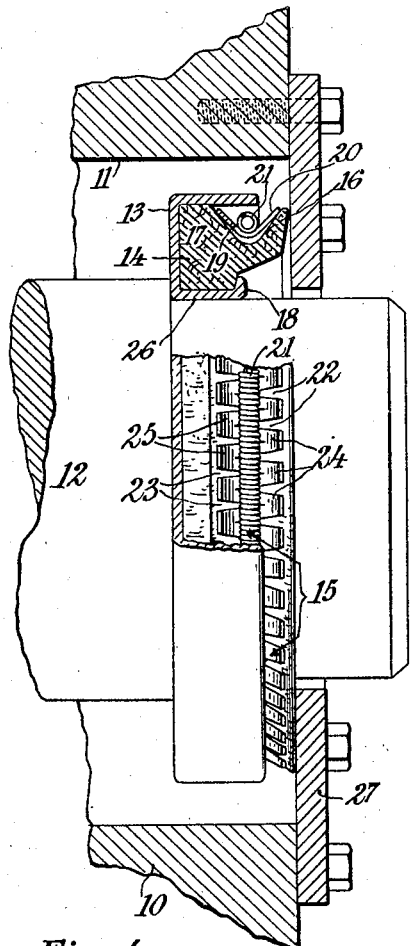
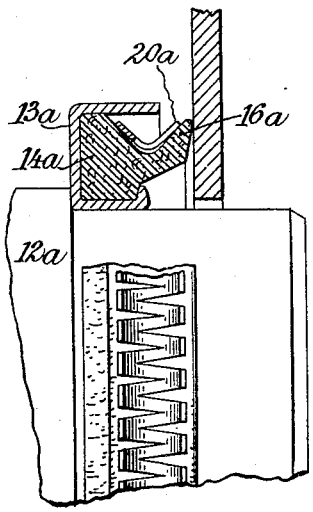
Fig.3.
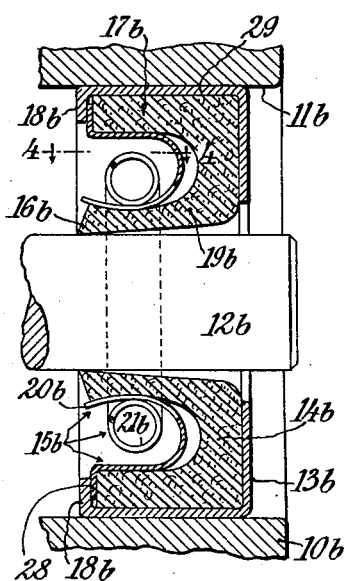
Fig.4.
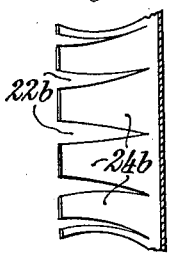
INVENTOR
Maxwell E. Salisbury,
BY
Fraser, Myers & Manley,
ATTORNEYS.

Patented Apr. 13, 1937

2,076,747

UNITED STATES PATENT OFFICE 2,076,747

SELF-ADJUSTING OIL RETAINER

Maxwell E. Salisbury, Palmyra, N. Y., assignor to The Garlock Packing Company, a corporation of New York Application October 19, 1935, Serial No. 45,728

5 Claims. (Cl. 286—7)

This invention relates to machinery packings for preventing the passage of oil, grease or the like through the opening between two relatively rotatable machine elements, as for example, the opening in a stationary casing through which a rotating shaft passes. Such a packing essentially comprises a sealing ring formed of suitable flexible packing material and mounted in leak-tight relationship to one of the machine elements, and a resilient member which is adapted by its inwardly directed pressure to force the ring into frictional engagement with the other element.

The principal object of the present invention is to increase the effectiveness and useful life of such a seal by providing it with a resilient member which is adapted to change its effective pressure on the ring in accordance with changes in the relative rotational speed of the two machine parts.

Another object of the present invention is to provide a sealing assembly in which the sealing ring and the resilient member thereof are affixed to the one of the machine elements which rotates whereby the latter member may be affected by centrifugal force to reduce its total, or effective, inwardly directed pressure upon the sealing ring when the machine is in operation.

A further object of the invention is to provide a self-adjustable sealing assembly which may be manufactured as a unit and which may readily be applied to a machine with which it is to be used.

Other objects and various features of the invention making for economy in manufacture and efficiency in operation will be more apparent from the following description when read in connection with the accompanying drawing, in which Figure 1 is a fragmentary elevational view showing the invention applied to a machine in which a rotating shaft element passes through an opening in a stationary casing, certain parts being represented in cross section;

Fig. 2 is a similar view showing a modified form of seal;

Fig. 3 is a fragmentary sectional view of the seal of the present invention as applied to a machine in which the casing element of the machine rotates about a stationary shaft element thereof; and Fig. 4 is a sectional plan view of a portion of the spreader element of Fig. 3.

Considering the drawing, Fig. 1 shows a fragment of a machine comprising a stationary element 10 which may, for example, be a casing, having a bore 11 therein through which a rotating shaft 12 passes. In order to close the opening between these two elements against the passage of oil, grease, or the like, some form of seal must be applied; and in practice this seal usually takes the form of a ring of flexible packing material which is mounted in leak-tight relationship with one of the parts and is resiliently pressed into frictional, or wiping, contact with the other part.

In practice it has been found that it is somewhat more difficult to form an effective closure between the parts when the machine is not in use than it is when the machine is in operation; that is, a greater pressure must be exerted upon the sealing ring to form an effective seal in the first case than is necessary in the latter. Accordingly, prior sealing assemblies in which the resilient member thereof exerted a constant pressure on the sealing ring have either been ineffectual when the machine to which the assembly was applied was idle, or the sealing ring thereof has been subjected to undue wear when the machine was in operation.

The present invention proposes to avoid these difficulties by providing the assembly with a resilient means which will change its total, or effective, pressure upon the sealing ring in accordance with changes in the relative rotational speed of the two machine parts between which the sealing assembly is positioned; that is, the resilient means will apply a maximum pressure to the ring when the two parts are idle, and a reduced pressure when one of the parts rotates with respect to the other. Preferably this is accomplished by utilizing centrifugal force.

Further, the sealing assembly of this invention is preferably of the unitary type which may be manufactured in large quantities, and then applied to individual machines without requiring any substantial amount of custom fitting.

In accordance with these principles, then, the assembly comprises an annular shell 13, a sealing ring 14 and a resilient member 15 encircling the sealing ring. Preferably, the sealing ring has a marginal sealing lip 16 which is adapted to make wiping contact with one of the machine elements, as will later appear; and an annular body portion 17 disposed within the shell and held therein by the upturned flange 18. Further, the ring is provided with an annular groove 19 in which the resilient means 15 is disposed. The resilient means may take any desired form, and, as is shown in Fig. 1, for example, it may comprise a flexible spreader 20 which is encircled by a garter spring 21. The spreader, preferably, is formed from a ring of flexible metal having its opposite edges notched as at 22 and 23 to provide a plurality of marginal fingers 24 and 25. It is particularly to be noted that each of the notches extends from one side of the ring to a point beyond the center line thereof so that each of the fingers may be of a length which is greater than one half the width of the ring. Further, the ring is preferably of V-shaped cross section, the angle in the V being slightly greater than the angle between the sides of the groove 19. With such an arrangement it is apparent that the inwardly directed pressure of the garter spring 21 will tend to contract the spreader whereby the fingers of the latter may force the sealing lip 16 away from the body portion 17. If desired, however, the sealing lip may be changed slightly in shape so that the use of the garter spring alone will suffice; or if desired, as is shown in Fig. 2, the use of the garter spring may be avoided. In this latter case the spreader ring 20a will be designed exactly as was above described in connection with Fig. 1, but it will be made of a material which will have suitable spring characteristics.

Considering the functioning of the assembly it will be seen that when the sealing ring is stationary the resilient means will exert its total inwardly directed pressure against the sealing lip. However, if the sealing ring were rotated, centrifugal force would immediately come into play, and acting upon the resilient means would tend to lengthen it, whereupon the inwardly directed pressure thereof on the sealing lip would be reduced by an amount corresponding to centrifugal force. In order to accomplish this, therefore, the sealing assembly is preferably mounted upon the rotating part of the machine whereby the rotation thereof may affect the resilient means to achieve the foregoing desired result. Accordingly, as is shown in Fig. 1, the shell 13 is slipped over the shaft 12 and affixed in leak-tight relationship thereto. The latter may be done in any desired manner, as for example, by providing a press fit between the inner flange 26 of the shell and the outer surface of the shaft. The assembly is completed by covering the end of the bore 11 with a removable sealing plate 27, the plate making leak-tight contact with the casing in any desired way.

In the completed assembly it will be seen that the sealing lip 16 is adapted to make wiping contact with the inner surface of the sealing plate whereby the passage of grease, oil, or the like, is effectively prevented. Accordingly, when the shaft is stationary the resilient means will apply its maximum inwardly directed pressure against the lip to force the latter snugly against the surface of the plate. However, when the shaft is rotated centrifugal force will act to reduce the pressure of the resilient means upon the lip. It can be seen, then, that this seal will always provide an effective closure between the parts regardless of whether the machine is, or is not, in use, and that undue wear of the sealing ring will be avoided.

Usually, with machines of the type herein generally described, the shaft element constitutes the rotating part and the casing is stationary. However, occasionally this order will be reversed; that is, the casing will rotate about a stationary shaft. This change in the form of the machine in no way changes the principles of the invention but it will usually require a change in the embodiment thereof. Thus, the sealing ring of such an assembly may take any desired form and have any desired cross section, it being only necessary that some means be provided for attaching the ring to the rotating casing and that the ring shall have a sealing lip which is resiliently pressed into contact with the stationary shaft; and that the resilient means which accomplishes the latter purpose shall be so positioned with respect to the ring as to be affected by centrifugal force.

A unitary sealing assembly which may be applied to such a machine is shown in Fig. 3, and comprises, essentially, an annular metal shell 13b, a sealing ring 14b, and a resilient means 15b which is adapted to force a portion of the latter into frictional engagement with a part of the machine. In the preferred embodiment the ring has a flexible sealing lip 16b formed along one of the inner peripheral edges, and a body portion 17b which is disposed within the shell and held therein by the flange 18b. In order to impart flexibility to the lip whereby it may be moved radially a groove, or channel, 19b, is cut into one side face of the ring; and in the groove the resilient means 15b is preferably disposed.

The resilient means may take any desired form, and may comprise, for example, a flexible spreader 20b and a garter spring 21b. Where a spreader is employed, it preferably will take a form similar to that shown in Figs. 3 and 4, that is, it will comprise a ring of flexible material which is substantially U-shaped in cross section, and which is notched along its inner edge, as at 22b, to provide a plurality of fingers 24b. Further, the spreader may have an upturned marginal flange 28 which is adapted to be positioned between the body portion 17b of the sealing ring, and the flange 18b of the shell. The garter spring 21b, just as was described in connection with Fig. 1, encircles the spreader and is adapted by its inwardly directed pressure to contract the spreader whereby the fingers 24b of the latter may force the sealing lip 16b radially inward.

While the resilient means above described has certain advantages, it is possible to omit the spreader and utilize the spring alone; or under certain circumstances the spreader may be used without the spring. In the latter case the spreader member will be designed just as previously described, but it will be made of a material having adequate spring characteristics.

The functioning of such an assembly is substantially identical with that previously described. Accordingly, when the assembly is stationary the resilient means is adapted to apply its maximum inwardly directed pressure upon the sealing lip, whereas, if it is rotated centrifugal force will act upon the means to reduce the effective pressure on the lip.

In order to achieve these desired results then, the assembly is slipped over the stationary shaft 12b with its sealing lip 16b in contact therewith, and the shell is affixed to the rotary casing in leak-tight relation. The latter may be done in any desired way, as for example, by providing a press fit between the bore 11b of the casing and the outer flange 29 of the shell.

Where both of the members rotate but one has a greater speed than the other, it is apparent that the invention may still be used to accomplish the desired results. In such case the assembly of Figs. 1, 2 or 3 may be used, depending upon which may be most easily and readily applied.

No claim is made herein to the general form of sealing assembly illustrated in Figure 3, comprising the sealing element, casing and spreader when not used in such manner as to be affected by centrifugal force. Such an assembly, generally, is a prior invention of others than this applicant and will be made the subject matter of another application.

The character of the spring element is largely dependent upon the particular machine with which it is to be used. In other words, the size, weight, and initial tension of the element will be determined by the diameter of the sealing ring and the maximum speed of the machine element by which it is to be carried. Usually a standard size spring may be adopted for any standard size of sealing ring, and the other factors, namely, the tension and weight, may be adjusted for individual cases. Thus, the tension may readily be changed by reducing the effective length of the spring; and its weight may be increased by loading. The latter can conveniently be accomplished, for example, by applying a lead wire to the inside of the spring, or by dipping it into molten lead. Similarly, where the modification of Fig. 2 is used, the combination spring-spreader element may be loaded to adapt it to the individual requirements of different machines.

Since certain changes may be made in the invention which are totally within the ability of a skilled mechanic it is intended that the foregoing shall be construed in a descriptive rather than in a limiting sense.

What I claim is:

1. An automatically adjustable seal for closing the opening between two relatively rotatable machine elements comprising an annular metal shell adapted to be fixedly mounted on and in fluid-tight relation with the one of the machine elements which rotates when the machine is in use, a flexible sealing ring having an annular body portion in the shell, a sealing lip, and a groove in the outer peripheral face of the sealing ring which when spread will force such sealing lip into wiping contact with the other element of the machine, and a resilient means comprising a spreader ring disposed in said groove and a spiral spring encircling said spreader ring, said resilient means being adapted by its inwardly directed pressure to press said sealing lip against the other element of the machine, and being of such weight and initial tension that it will be urged radially outwardly by centrifugal force when it is rotated at the normal speed of the machine whereby the effective sealing pressure on the ring will vary with changes in the relative rotational velocity of the machine element.

2. An automatically adjustable seal for closing the opening between two relatively rotatable machine elements comprising an annular metal shell adapted to be fixedly mounted on and in fluid-tight relation with the one of the machine elements which rotates when the machine is in use, a flexible sealing ring having an annular body portion in the shell and having a sealing lip which is adapted to be pressed into wiping contact with the other element of the machine, and a resilient means comprising a ring of spring metal having a plurality of notches along its opposite edges each of which extends from its respective edge to a point beyond the center line of the ring, said resilient means being adapted by its inwardly directed pressure to press said sealing lip against the other element of the machine, and being of such weight and initial tension that it will be urged radially outwardly by centrifugal force when it is rotated at the normal speed of the machine whereby the effective sealing pressure on the ring will vary with changes in the relative rotational velocity of the machine element.

3. An automatically adjustable seal for closing the opening between two relatively rotatable machine elements comprising an annular metal shell adapted to be fixedly mounted on and in fluid-tight contact with the rotatable element of the machine, a closure ring adapted to have a fluid-tight connection with the other element of the machine, a flexible sealing ring having an annular body portion which is disposed within said shell and having a sealing lip which is adapted to make wiping contact with said closure ring, and a resilient means encircling said sealing ring, said means being adapted by its inward pressure to press the said sealing lip into contact with said closure ring, and being of such weight and initial tension that it will be urged radially by centrifugal force when it is rotated at the normal speed of the rotatable element whereby the effective pressure of said means upon the sealing ring will vary with changes in the relative velocity of said elements.

4. An automatically adjustable seal in accordance with claim 3 in which the relatively rotatable machine elements are a casing and a shaft which passes through an opening therein, and in which the shell and sealing ring are so disposed within the casing that the sealing lip of the latter may make wiping contact with the inner face of the closure ring.

5. An automatically adjustable seal for closing the opening in a stationary casing through which a rotating shaft passes comprising an annular metal shell adapted to be fixedly mounted within the casing upon the shaft and in fluid-tight relation therewith, a plate adapted to have a fluid-tight connection with the casing, said plate being disposed over the opening in the casing and having a smaller opening therein through which the shaft passes, a flexible sealing ring having an annular body portion disposed within the shell and a sealing lip which is adapted to make wiping contact with the inner surface of said plate, and a resilient member encircling said ring, said resilient member being adapted by its inwardly directed pressure to press said sealing lip against said plate and being of such weight and initial tension as to be urged radially outward by centrifugal force when the shaft is rotating at its normal speed whereby the effective pressure on the sealing lip will vary with changes in the rotational speed of the shaft.

MAXWELL E. SALISBURY.